United States Patent
Celik et al.

(10) Patent No.: US 12,442,601 B2
(45) Date of Patent: Oct. 14, 2025

(54) HEAT EXCHANGER ARRANGEMENT, METHOD FOR PRODUCING A HEAT EXCHANGER ARRANGEMENT, AND INTERNAL COMBUSTION ENGINE HAVING THE HEAT EXCHANGER ARRANGEMENT

(71) Applicant: MANN+HUMMEL GmbH, Ludwigsburg (DE)

(72) Inventors: Atila Celik, Renningen (DE); Alexander Korn, Gueglingen (DE); Hans-Peter Hielscher, Winnenden (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 361 days.

(21) Appl. No.: 17/592,982

(22) Filed: Feb. 4, 2022

(65) Prior Publication Data
US 2022/0155030 A1    May 19, 2022

Related U.S. Application Data

(63) Continuation of application No. PCT/EP2020/067487, filed on Jun. 23, 2020.

(30) Foreign Application Priority Data

Aug. 9, 2019 (DE) ............... 10 2019 121 494.7

(51) Int. Cl.
*F28F 9/00* (2006.01)
*F28F 9/18* (2006.01)

(52) U.S. Cl.
CPC ............ *F28F 9/001* (2013.01); *F28F 9/187* (2013.01); *F28F 2230/00* (2013.01)

(58) Field of Classification Search
CPC ......... F28F 9/001; F28F 9/187; F28F 2230/00
(Continued)

(56) References Cited

U.S. PATENT DOCUMENTS 4,303,052 A * 12/1981 Manfredo ................. F01P 3/18
165/149
4,436,145 A * 3/1984 Manfredo ........... F02B 29/0456
60/599

(Continued)

FOREIGN PATENT DOCUMENTS

| DE | 102006051000 A1 | 7/2007 |
| DE | 102012212110 A1 | 1/2014 |

OTHER PUBLICATIONS

Office Action in corresponding Chinese Appln. No. 202080056477.5, Dec. 25, 2024, 10 pages, China.
(Continued)

*Primary Examiner* — Claire E Rojohn, III

(57) ABSTRACT

A heat exchanger arrangement is provided with a housing provided with a fluid inlet and a fluid outlet and designed to be flowed through by the fluid. A heat exchanger is arranged in the housing between fluid inlet and fluid outlet and surrounded by the housing. The heat exchanger is arranged such that the fluid can flow through the heat exchanger. The housing has a seal contour. The heat exchanger is connected with form fit at a fluid inlet of the heat exchanger or at a fluid outlet of the heat exchanger to the seal contour of the housing. In a method of producing the heat exchanger arrangement, a seal surface of the seal contour of the housing is melted and pressed against a seal region of the heat exchanger at the fluid inlet of the heat exchanger or at the fluid outlet of the heat exchanger.

17 Claims, 7 Drawing Sheets

(58) Field of Classification Search
USPC .......................................................... 165/51
See application file for complete search history.

(56) References Cited

U.S. PATENT DOCUMENTS

| | | | | |
|---|---|---|---|---|
| 4,474,162 | A * | 10/1984 | Mason | F28F 9/0075 165/149 |
| 6,474,284 | B1 * | 11/2002 | Baumann | F02M 35/082 123/184.42 |
| 7,707,997 | B2 * | 5/2010 | Yoon | F28F 21/084 123/568.12 |
| 7,793,710 | B2 * | 9/2010 | Lamich | F28D 7/1692 228/183 |
| 8,016,025 | B2 * | 9/2011 | Brost | F28F 9/0229 165/149 |
| 8,286,615 | B2 * | 10/2012 | Dehnen | F02B 29/0462 123/542 |
| 8,651,092 | B2 * | 2/2014 | Ghiani | F28D 7/1684 123/542 |
| 8,695,574 | B2 * | 4/2014 | Nguyen | F28F 9/001 123/542 |
| 8,794,299 | B2 * | 8/2014 | Barfknecht | F28F 9/0236 165/145 |
| 9,038,610 | B2 * | 5/2015 | Meshenky | F28F 9/026 165/203 |
| 9,175,596 | B2 * | 11/2015 | Eilemann | F02B 29/0462 |
| 9,671,168 | B2 * | 6/2017 | Glück | F28D 9/0056 |
| 9,766,023 | B2 * | 9/2017 | Schatz-Knecht | F28D 7/1653 |
| 9,897,384 | B2 * | 2/2018 | Odillard | F02M 35/112 |
| 10,047,663 | B2 * | 8/2018 | Kinder | F02B 29/0462 |
| 10,180,102 | B2 * | 1/2019 | Kondo | F02B 37/00 |
| 10,451,362 | B2 * | 10/2019 | Kinder | F28D 9/0006 |
| 10,571,204 | B2 * | 2/2020 | Arndt | F28F 21/067 |
| 10,619,946 | B2 * | 4/2020 | Meshenky | F02B 29/0462 |
| 10,641,559 | B2 * | 5/2020 | Yoo | F28F 3/048 |
| 10,655,575 | B2 * | 5/2020 | Arinaga | F02M 35/112 |
| 10,830,539 | B2 * | 11/2020 | Dornseif | F28D 9/0043 |
| 10,955,197 | B2 * | 3/2021 | Stewart | F28D 9/0043 |
| 11,306,982 | B2 * | 4/2022 | Warnery | F28D 9/0031 |
| 11,573,058 | B2 * | 2/2023 | Oh | F28F 9/026 |
| 2002/0023734 | A1 * | 2/2002 | Wagner | F28F 9/0226 165/173 |
| 2004/0112577 | A1 * | 6/2004 | Beck | F28F 3/044 165/41 |
| 2006/0278377 | A1 * | 12/2006 | Martins | F02B 29/0418 165/140 |
| 2007/0181105 | A1 * | 8/2007 | Bazika | F02B 29/0462 123/563 |
| 2008/0251242 | A1 * | 10/2008 | Irmler | F28F 21/065 165/164 |
| 2008/0289804 | A1 * | 11/2008 | Baumann | F28D 7/1692 165/157 |
| 2009/0277606 | A1 * | 11/2009 | Reiss, III | F28D 7/1692 165/69 |
| 2011/0168366 | A1 * | 7/2011 | Garret | F28F 9/001 165/148 |
| 2012/0210986 | A1 * | 8/2012 | Ghiani | F28F 9/001 123/542 |
| 2012/0285423 | A1 * | 11/2012 | Nguyen | F28F 9/002 123/542 |
| 2013/0133869 | A1 * | 5/2013 | Kinder | F28F 9/02 165/173 |
| 2014/0000850 | A1 | 1/2014 | Korn et al. | |
| 2014/0109858 | A1 * | 4/2014 | Ancel | F02M 26/30 123/184.21 |
| 2014/0130764 | A1 * | 5/2014 | Saumweber | F02M 35/10 123/184.21 |
| 2014/0216385 | A1 * | 8/2014 | Bruggesser | F28F 27/02 123/184.21 |
| 2014/0224458 | A1 * | 8/2014 | Dornseif | F02B 29/0462 165/157 |
| 2014/0246186 | A1 * | 9/2014 | Bruggesser | F28D 9/0031 165/168 |
| 2014/0311142 | A1 * | 10/2014 | Speidel | F02B 29/0462 60/599 |
| 2014/0311143 | A1 * | 10/2014 | Speidel | F02B 29/0437 60/599 |
| 2014/0326222 | A1 * | 11/2014 | Hummel | F02M 35/10268 123/542 |
| 2014/0345577 | A1 * | 11/2014 | Meshenky | F28F 9/026 123/542 |
| 2014/0374073 | A1 * | 12/2014 | Schatz-Knecht | F28D 7/1653 165/151 |
| 2015/0068717 | A1 * | 3/2015 | Gluck | F28D 1/0341 29/890.039 |
| 2015/0102596 | A1 * | 4/2015 | Korn | F02M 35/10078 285/136.1 |
| 2015/0129168 | A1 * | 5/2015 | Odillard | F28F 9/0075 165/71 |
| 2015/0168076 | A1 * | 6/2015 | Ferlay | F28D 9/0062 165/166 |
| 2015/0184952 | A1 * | 7/2015 | Ignjatovic | F28F 9/02 165/158 |
| 2015/0285572 | A1 * | 10/2015 | Fleitling | F28F 3/042 165/167 |
| 2015/0338167 | A1 * | 11/2015 | Pomin | F28D 1/05391 165/151 |
| 2016/0097596 | A1 * | 4/2016 | Stewart | F28F 1/045 165/175 |
| 2016/0177881 | A1 * | 6/2016 | Wicks | F02M 35/10026 123/568.12 |
| 2016/0245597 | A1 * | 8/2016 | Meshenky | F28F 9/0253 |
| 2016/0320140 | A1 * | 11/2016 | Meshenky | F28D 9/0043 |
| 2016/0334169 | A1 * | 11/2016 | Rubitschek | F28F 13/003 |
| 2017/0023315 | A1 * | 1/2017 | Devedeux | F02B 29/0462 |
| 2017/0038168 | A1 * | 2/2017 | Arndt | F28D 9/0056 |
| 2017/0108283 | A1 * | 4/2017 | Devedeux | F02M 35/10268 |
| 2017/0122678 | A1 * | 5/2017 | Richter | F02B 29/0481 |
| 2017/0160022 | A1 * | 6/2017 | Guengoer | F28F 9/002 |
| 2017/0205153 | A1 * | 7/2017 | Hermida Domínguez | F28F 9/001 |
| 2017/0268413 | A1 * | 9/2017 | Kinder | F02M 31/20 |
| 2017/0335746 | A1 * | 11/2017 | Somhorst | F28F 3/12 |
| 2018/0128555 | A1 * | 5/2018 | Kinder | F28F 9/0075 |
| 2018/0195431 | A1 * | 7/2018 | Yoo | F28F 9/001 |
| 2018/0306520 | A1 * | 10/2018 | Kolder | F02B 29/04 |
| 2019/0041137 | A1 * | 2/2019 | Stewart | F28F 21/06 |
| 2019/0049195 | A1 * | 2/2019 | Meshenky | F28F 9/001 |
| 2019/0063849 | A1 * | 2/2019 | McDonnell | F28D 9/0006 |
| 2019/0301808 | A1 * | 10/2019 | Holtzapple | B01D 1/305 |
| 2019/0339029 | A1 * | 11/2019 | Warnery | F28D 9/0031 |
| 2020/0011270 | A1 * | 1/2020 | Korn | F02M 35/10078 |
| 2020/0018271 | A1 * | 1/2020 | Hielscher | F16B 5/0275 |
| 2022/0155030 | A1 * | 5/2022 | Celik | F28D 7/1684 |
| 2024/0145740 | A1 * | 5/2024 | Korn | B01D 63/085 |
| 2024/0219123 | A1 * | 7/2024 | Wang | F28F 9/18 |

OTHER PUBLICATIONS

Office Action in corresponding German Appln. No. 112020003842.4, Aug. 5, 2025, 4 pages, Germany.

* cited by examiner

HEAT EXCHANGER ARRANGEMENT, METHOD FOR PRODUCING A HEAT EXCHANGER ARRANGEMENT, AND INTERNAL COMBUSTION ENGINE HAVING THE HEAT EXCHANGER ARRANGEMENT

CROSS-REFERENCE TO RELATED APPLICATIONS

This application is a continuation application of international application No. PCT/EP2020/067487 having an international filing date of 23 Jul. 2020 and designating the United States, the international application claiming a priority date of 9 Aug. 2019 based on prior filed German patent application No. 10 2019 121 494.7, the entire contents of the aforesaid international application and the aforesaid German patent application being incorporated herein by reference.

BACKGROUND OF THE INVENTION

The invention concerns a heat exchanger arrangement, a method for producing a heat exchanger arrangement, and an internal combustion engine with heat exchanger arrangement.

US 2014/0326222 A1 discloses a heat exchanger arrangement in the form of an intake pipe with integrated charge air cooler for an internal combustion engine. The charge air cooler is surrounded by the intake pipe and sealed in relation to the intake pipe by a circumferentially extending elastomer seal in order to avoid an undesirable bypassing of the charge air cooler by the heated charge air.

SUMMARY OF THE INVENTION

It is an object of the invention to provide an improved heat exchanger arrangement.

A further object is providing a method for producing such a heat exchanger arrangement.

A further object is providing an internal combustion engine with such a heat exchanger arrangement.

The aforementioned object is solved according to an aspect of the invention by a heat exchanger arrangement with a heat exchanger that is surrounded by a housing, wherein the housing can be flowed through by a fluid and comprises a fluid inlet and a fluid outlet for the fluid, wherein the heat exchanger is arranged between fluid inlet and fluid outlet so that the fluid can flow through it. The housing comprises a seal contour to which the heat exchanger is connected with form fit at its fluid inlet or fluid outlet.

According to a further aspect of the invention, the object is solved by a method for producing such a heat exchanger arrangement with housing and heat exchanger in that a seal surface of a seal contour in the housing is melted and pressed against a seal surface of the heat exchanger. By a plastic deformation, the seal contour is placed seal-tightly against the seal surface of the heat exchanger and remains in the sealing position.

In the meaning of the application, "seal-tight" is understood such that, for provided operating states of the internal combustion engine, the air that is flowing through the housing is guided through the heat exchanger and does not flow within the housing externally past the heat exchanger. The seal contour can thus prevent a bypass flow about the heat exchanger within the housing in the provided operating states of an internal combustion engine.

According to a further aspect of the invention, the object is solved by an internal combustion engine with such a heat exchanger arrangement.

Beneficial embodiments and advantages of the invention result from the additional claims, the description, and the drawing.

A heat exchanger arrangement is proposed with a heat exchanger that is surrounded by a housing. The housing can be flowed through by a fluid and comprises a fluid inlet and a fluid outlet for the fluid, wherein the heat exchanger is arranged between fluid inlet and fluid outlet so that the fluid can flow through it. The housing comprises a seal contour to which the heat exchanger is connected with form fit at its fluid inlet or fluid outlet.

The heat exchanger can comprise a single fluid inlet and/or fluid outlet. Then, the seal contour can be designed such that it is formed at an inner wall of the housing so as to extend circumferentially. The heat exchanger can optionally comprise also a plurality of cooling regions so that the seal contour is designed such that the latter surrounds the respective fluid inlet or the respective fluid outlet of the cooling regions.

A form fit connection can be achieved when the seal contour of the housing and the seal region of the heat exchanger are comprised of different materials. For example, the seal contour can be comprised of plastic material and the seal region of the heat exchanger of metal.

Advantageously, the seal contour can be a component of the housing, in particular, the seal contour can be configured so as to be materially fused to the housing.

In this context, the seal contour can be formed monolithically and as one piece by the housing as a discrete contour. The seal contour, similar to a seal lip, can be formed integrally at the housing. Preferably, a seal contour in the form of a rib can be provided that comprises no further functions aside from the seal function.

Advantageously, a separate seal can be dispensed with by the joining process of the heat exchanger arrangement. In this way, faulty assemblies and thus possibly undetected leakages can be avoided. Moreover, cost savings due to the elimination of separate elastomer seals and the elimination of the assembly process of the separate seals are advantageous.

Due to the form fit connection between heat exchanger and seal contour, tolerances between the components heat exchanger and housing can be compensated. Moreover, the required installation space for the heat exchanger in the housing can be significantly reduced. The reduced installation space requirement enables beneficially an optimized design with respect to burst pressure and pressure pulsation of the housing.

According to a beneficial embodiment of the heat exchanger arrangement, the housing can be formed of at least two shells which are sequentially arranged in the flow direction of the fluid in intended use. In particular, one shell can be connected to the other shell at a contact location, in particular welded. Advantageously, the plastic deformation of the seal contour can be integrated into the welding process.

According to a beneficial embodiment of the heat exchanger arrangement, the seal contour can be arranged at an inner wall of one shell, in particular integrally formed. A position and geometry beneficial for the installation of the heat exchanger can be selected for the seal contour. For example, the seal contour can be configured in the form of a circumferentially extending rib that surrounds the fluid outlet or fluid inlet of the heat exchanger.

According to a beneficial embodiment of the heat exchanger arrangement, at least the seal contour can comprise a region with seal surface which contacts the heat exchanger, wherein at least the region can be formed of plastic material. In particular, the housing and the seal contour can be comprised of plastic material, preferably of a thermoplastic plastic material, for example, of a polyamide, for example, with a filler such as glass fiber or other known additives. Expediently, the seal contour can be arranged inside of a connection flange of one of the shells. Advantageously, during the welding process which serves primarily for air-tightly connecting the shells, the rib of the shell can be partially melted at its end face and, during a joining process, can be seal-tightly connected to a seal region at the heat exchanger, for example, a flange. Due to the additional welding action, i.e., melting or plastic deformation of the material at the end face of the rib, component tolerances between the seal region of the heat exchanger and the seal contour can be easily compensated. Also, a different heat expansion of the materials of heat exchanger and housing can be compensated by the seal. The reduced installation space requirement for the heat exchanger enables in addition an optimal design with respect to burst pressure and pressure pulsation of the housing.

According to a beneficial embodiment of the heat exchanger arrangement, a seal surface of the seal contour toward the heat exchanger can be coplanar with a seal surface of one of the shells toward the other shell. This enables a beneficial joining process of the heat exchanger with the seal contour while the shells of the housing are being connected to each other. Optionally, the heat exchanger can however also be positioned at a slant in relation to the seal surface of the shells and/or can comprise an offset and/or one or both seal surfaces can be of a corrugated configuration.

According to a beneficial embodiment of the heat exchanger arrangement, the seal surface of the seal contour toward the heat exchanger can be aligned with the seal surface of one of the shells toward the other shell. This enables a beneficial joining process of the heat exchanger with the seal contour while the shells of the housing are being joined with each other. Optionally, the heat exchanger can however also be positioned at a slant in relation to the seal surface of the shells and/or can comprise an offset and/or one or both seal surfaces can be of a corrugated configuration.

According to a beneficial embodiment of the heat exchanger arrangement, the heat exchanger can be surrounded completely by the housing. Advantageously, due to the reliable sealing action toward the housing at the inner side of the housing, an undesirable bypassing of the heat exchanger by the fluid can be prevented. In particular, the heat exchanger can be completely immersed in one of the shells. Alternatively, the heat exchanger can be immersed in both shells. The arrangement of the heat exchanger in the housing can be selected depending on the available installation space.

According to a beneficial embodiment of the heat exchanger arrangement, the heat exchanger can comprise a metal flange, for example, of aluminum, for connection to one of the shells. The plastic material-metal connection can enhance the seal-tightness of the connection over the service life of the heat exchanger arrangement. In contrast to a conventional elastomer seal, the connection cannot settle under temperature influence and/or the influence of fluids in the housing.

According to a beneficial embodiment of the heat exchanger arrangement, the heat exchanger can be designed as a charge air cooler and the housing as intake pipe or charge air distributor. This enables an inexpensive provision of an intake pipe or charge air distributor with reduced installation space requirement of the heat exchanger and enables a sealing action with long-term stability of the heat exchanger in the intake pipe. Undesirable leakages of the charge air around the charge air cooler inside the housing can be avoided.

According to a further aspect of the invention, a method for producing a heat exchanger arrangement, comprising a housing and a heat exchanger that is surrounded by the housing, is proposed, wherein the housing can be flowed through by a fluid and comprises a fluid inlet and a fluid outlet for the fluid. In this context, the heat exchanger is arranged between fluid inlet and fluid outlet so that the fluid can flow through it. In this context, the housing comprises a seal contour to which the heat exchanger is connected with form fit at its fluid inlet or fluid outlet. A seal surface of the seal contour formed in the housing is melted and pressed against a seal region of the heat exchanger.

Advantageously, no separate seal must be inserted during the joining process. In this way, faulty assemblies and thus undetected leakages are avoided. This enables cost reductions due to the elimination of additional elastomer seals and the elimination of an additional assembly process for elastomer seals. Beneficially, tolerances between the components can be compensated. The installation space requirement for the heat exchanger can be significantly reduced. A sealing action with long-term stability can be achieved between heat exchanger and housing.

According to a beneficial embodiment of the method, melting of the seal surface can be carried out during a joining process, in particular a welding process, in which shells of the housing are connected to each other. This enables cost savings by a compact joining process in that housing and heat exchanger can be joined in a single method step. Optionally, the shells can however also be screw-connected to each other, riveted or connected by clips.

According to a further aspect of the invention, an internal combustion engine with a heat exchanger arrangement according to the invention is proposed, wherein the heat exchanger arrangement comprises a housing and a heat exchanger, wherein the housing is configured as an intake pipe for charge air and the heat exchanger is provided as a charge air cooler in the intake pipe.

Advantageously, a sealing action with long-term stability between charge air cooler and intake pipe is achieved. The installation space requirement of the charge air cooler is reduced. The specific requirements in regard to air tightness of the internal interface charge air cooler to intake pipe can be fulfilled. A bypass of hot air past the charge air cooler can be prevented or the air can be passed as completely as possible through the charge air cooler in order to ensure the cooling performance, i.e., the heat transfer from the hot air to the cooling water.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

Figure 1:
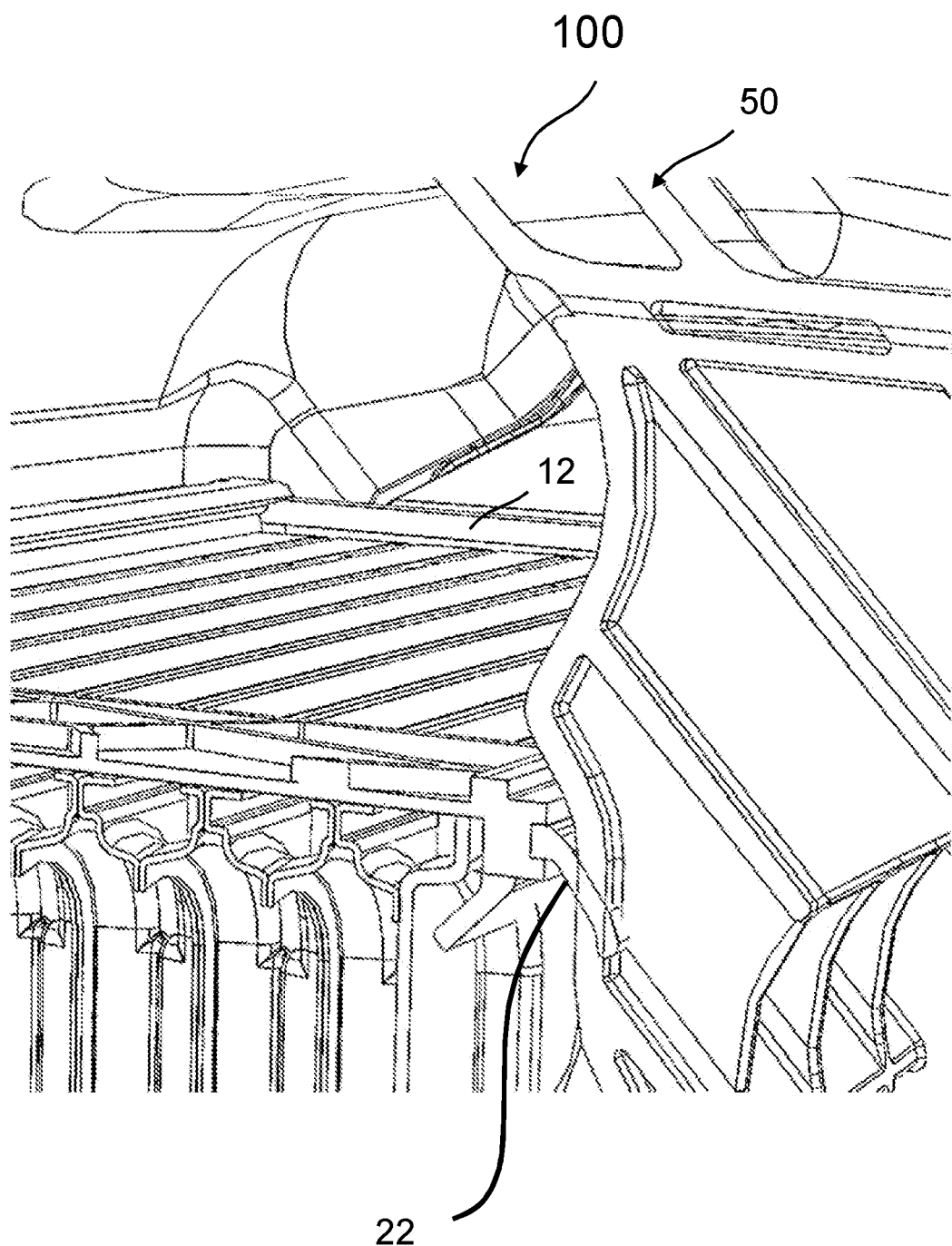
FIG. 1 shows a section illustration of an intake pipe with integrated charge air cooler with elastomer seal according to the prior art.

In the Figures, same or same-type components are identified with same reference characters. The Figures show only examples and are not to be understood as limiting.

FIG. 1 shows a section illustration of an intake pipe 50 with integrated charge air cooler and with an inserted separate elastomer seal between charge air cooler 12 and intake pipe 50 according to the prior art. The elastomer seal 22 must be mounted in a separate assembly step.

Figure 2:
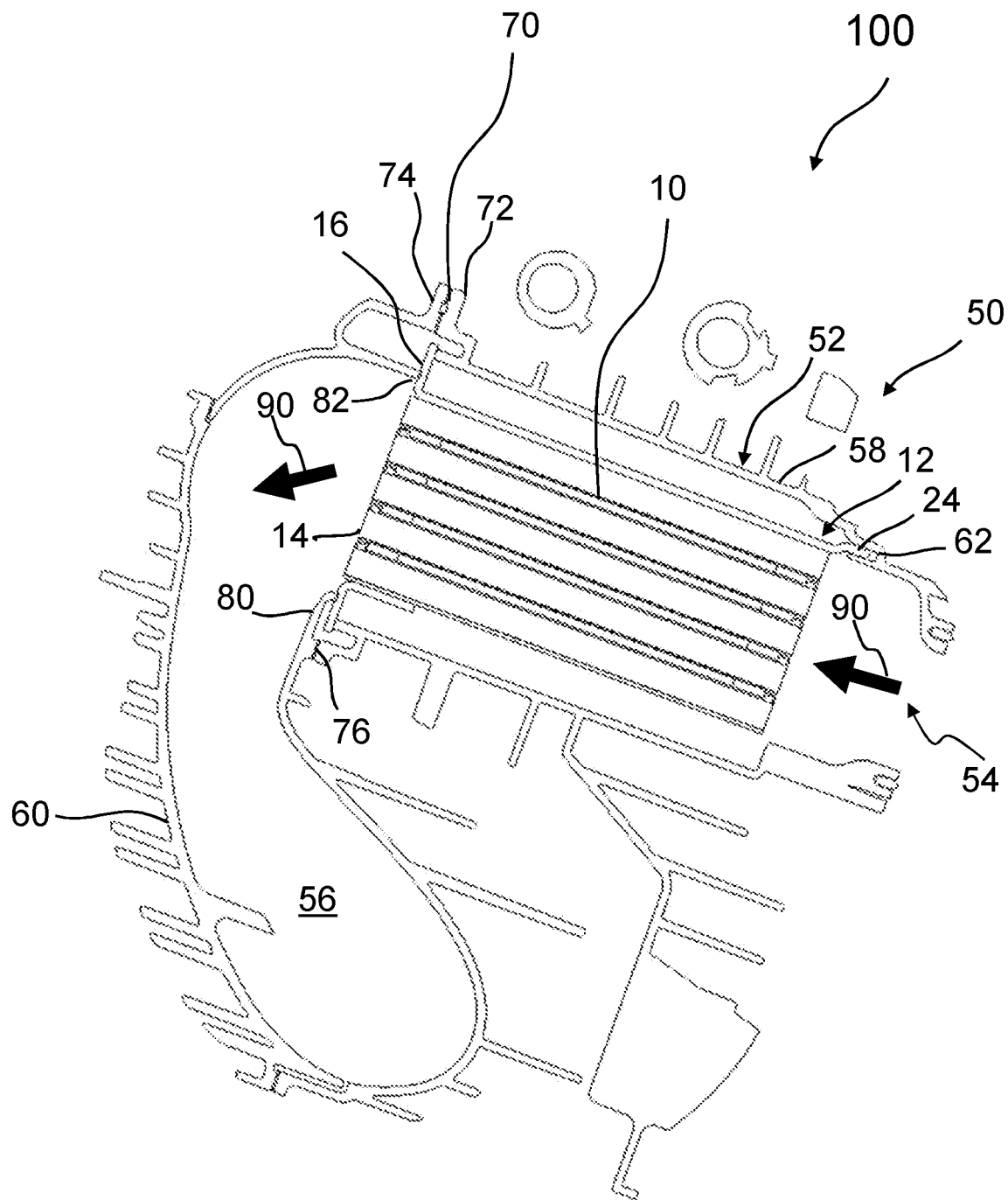
FIG. 2 shows a section illustration of a heat exchanger arrangement according to an embodiment of the invention.
Figure 3:
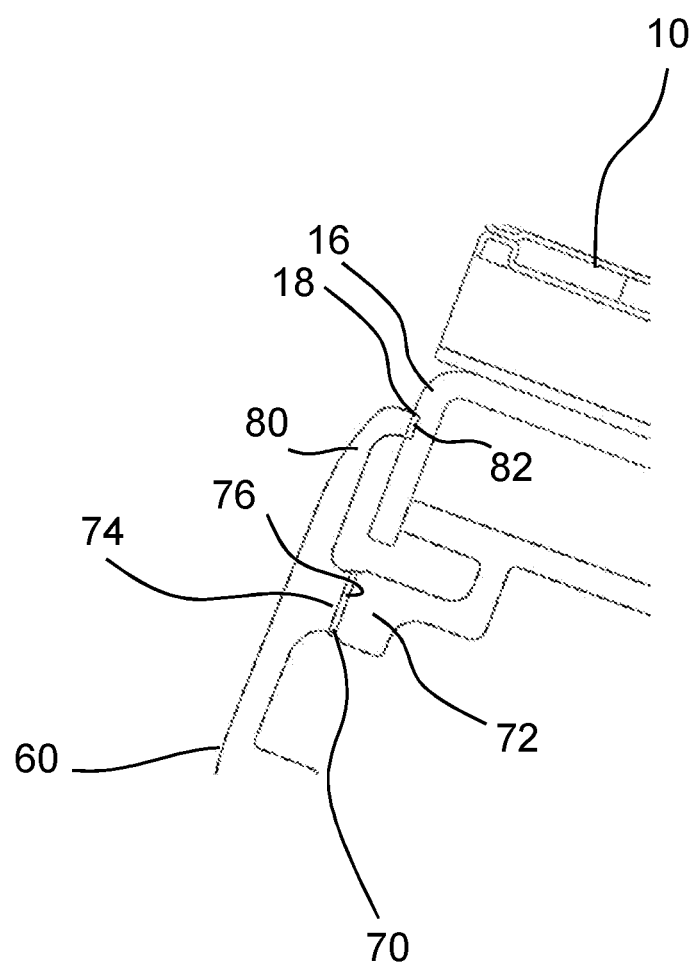
FIG. 3 shows a detail of an interface of the heat exchanger arrangement according to FIG. 2.

FIG. 2 shows a section illustration of a heat exchanger arrangement 100 according to an embodiment of the invention. FIG. 3 shows a detail of an interface of the heat exchanger arrangement 100 according to FIG. 2.

The heat exchanger arrangement 100 comprises a heat exchanger 10 surrounded by a housing 52. The housing 52 can be flowed through by a fluid and comprises a fluid inlet 54 and a fluid outlet 56 for the fluid. The heat exchanger 10 is arranged between fluid inlet 54 and fluid outlet 56 so that the fluid can flow through it. The housing 52 comprises, for example, a partially or completely circumferentially extending seal contour 80 to which the heat exchanger 10 is connected with form fit.

The housing 52 is configured, for example, as an intake pipe 50 and the heat exchanger 10 as a charge air cooler 12.

The housing 52 is formed of two shells 58, 60 which, for intended use, are sequentially arranged in the flow direction 90 of the fluid. One shell 58 is welded to the other shell 60 at a contact location 70 between the flange 72 of one shell 58 and the flange 74 of the other shell 60. Optionally, the shells can however also be screw-connected to each other, riveted or connected by clips.

The heat exchanger 10 is surrounded completely by the housing 52 and is completely immersed in the shell 58 which is positioned opposite the shell 60 with the seal contour 80. In this context, the heat exchanger 10 is inserted with an element 24 at its end remote from the seal contour 18 into a receptacle 62 of the shell 58.

In this embodiment, the seal contour 80 is integrally formed as a circumferentially extending rib at the inner side of one shell 60 and surrounds the fluid outlet of the heat exchanger 10 completely. A seal surface 82 of the seal contour 80 toward the heat exchanger 10 is coplanar to a seal surface 76 of one shell 60 toward the other shell 58. This facilitates joining of the components. Of course, the arrangement can also be selected such that the seal contour 80 surrounds the fluid inlet of the heat exchanger.

In this embodiment, the seal surface 82 of the seal contour 80 toward the heat exchanger 10 within the housing is aligned with the seal surface 76 of one shell 60 toward the other shell 58 toward the exterior.

The housing 52 with the seal contour 80 is formed, for example, of plastic material.

The heat exchanger 10 is configured at its end face 14 with a flange 16 and pressed against the seal contour 80. The end face 14 is, for example, the outflow-side end of the heat exchanger where the fluid exits from the heat exchanger 10.

The flange 16 is, for example, a metal flange, for example, of aluminum. The seal contour 80 contacts with the seal surface 82 the flange 16 at the seal surface 18.

Advantageously, the seal surface 82 of the seal contour 80 is melted and plastified in the welding process, in which the two shells 58, 60 are joined at their flanges 72, 74, and pressed against the seal region 18 of the heat exchanger 10 where the seal contour solidifies. When the shells 58, 60 are brought together, the heat exchanger 10 is clamped between the receptacle 62 and the seal contour 80.

Figure 4:
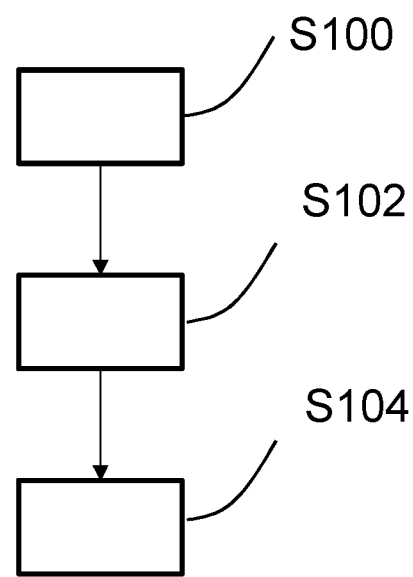
FIG. 4 shows a schematic process sequence for producing a heat exchanger arrangement.

FIG. 4 illustrates schematically the process sequence.

In step S100, two shells 58, 60 are provided, one of which is provided with a seal contour 80; the heat exchanger 10 is inserted into the other shell 58.

In step S102, the seal surface 82 of the seal contour 80 is partially melted and pressed against the flange 16 of the heat exchanger 10 in that the shells 58, 60 are brought together. In this way, component tolerances can be compensated.

In step S104, the flanges 72, 74 of the shells 58, 60 are connected to each other, in particular welded, and an airtight connection between the shells 58, 60 is produced.

FIGS. 5 to 8 show various views of an intake pipe 50 with a charge air cooler 12 in accordance with the afore described heat exchanger arrangement 100.

Figure 5:
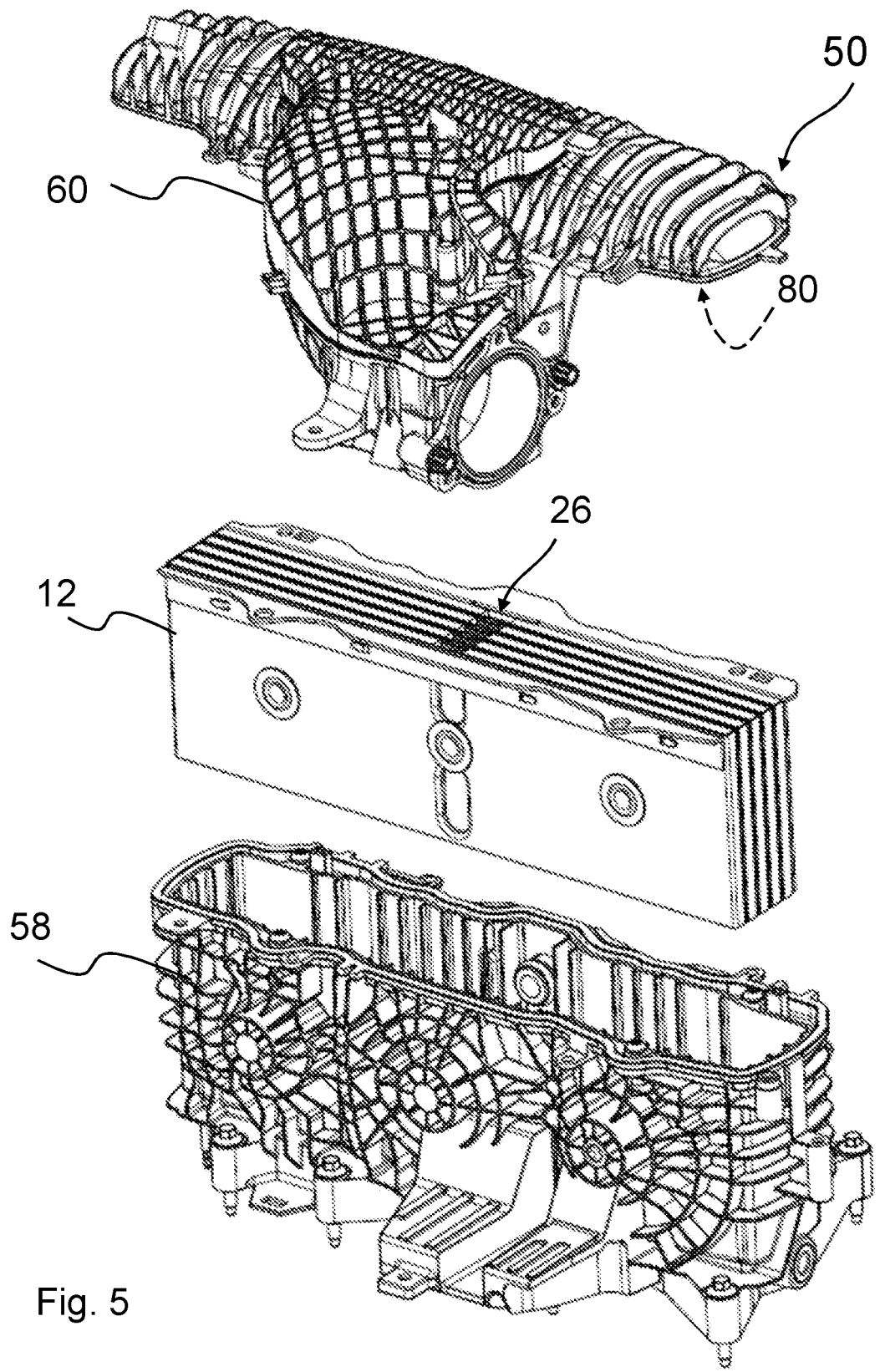
FIG. 5 shows in exploded illustration an intake pipe with a charge air cooler according to an embodiment of the invention.

FIG. 5 shows in exploded view the intake pipe 50 with two shells 58, 60 between which the charge air cooler 12 is arranged. The charge air cooler 12 comprises two separate cooling regions that are separated by an intermediate space 26 that is not flowed through. The seal contour 80 is arranged in the shell 60 and is indicated with dashed lead line.

Figure 6:
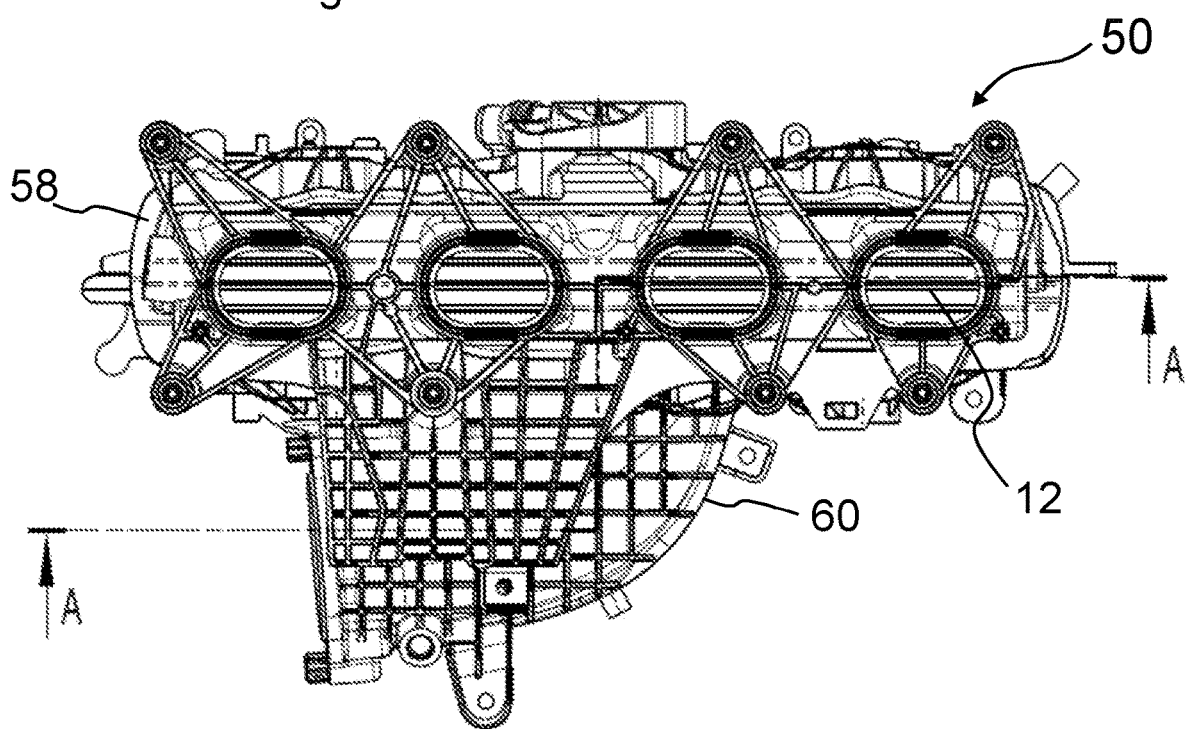
FIG. 6 shows as a plan view a shell of the intake pipe in FIG. 5 with indicated stepped section plane A.

FIG. 6 shows the intake pipe 50 as a plan view of the shell 58 of the intake pipe 50. The shell 58 comprises four outlet openings, not identified in detail, through which air cooled in the charge air cooler 12 exits from the intake pipe 50. The flow direction 90 of the air is indicated by thick arrows.

An indicated stepped section plane A extends through the shell 60 and the charge air cooler 12.

Figure 7:
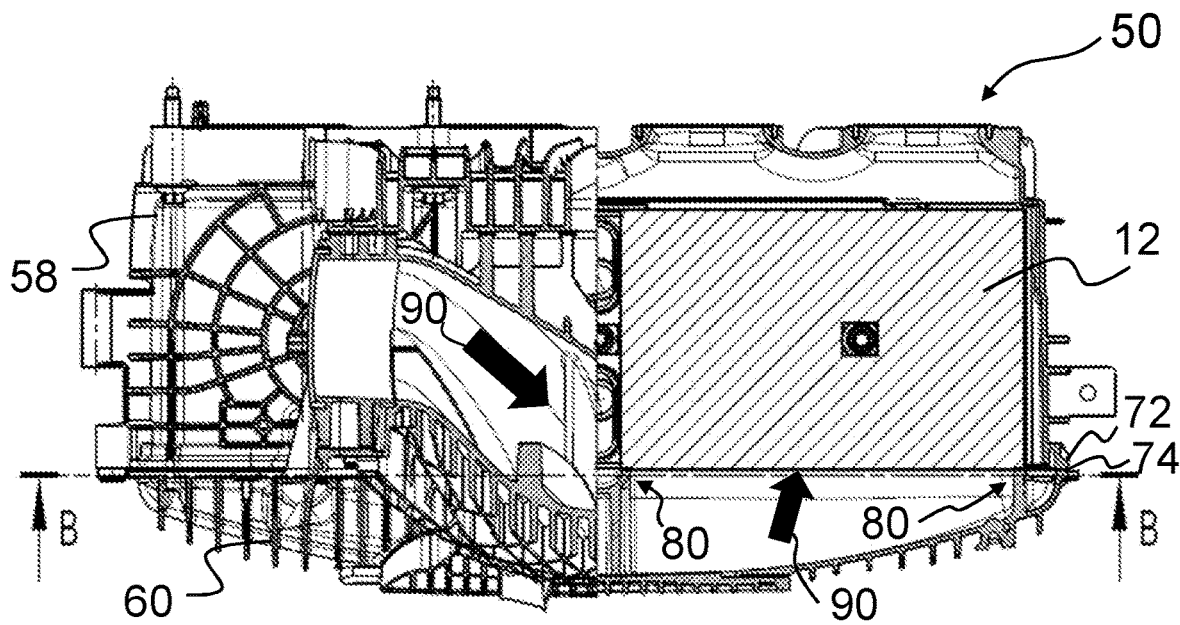
FIG. 7 shows a plan view in accordance with the section plane A of the intake pipe and the charge air cooler of FIG. 5 with an indicated section plane B through the intake pipe.

FIG. 7 shows the plan view of the section plane A with an indicated section plane B. In the left half of the illustration, the section plane A extends through a flow region of the shell 60 while in the right half of the illustration the charge air cooler 12 can be seen inside the intake pipe 50.

At the fluid inlet of the respective cooling region, the charge air cooler 12 is positioned at the seal contour 80 in the shell 60. At the fluid outlet, the charge air cooler 12 is supported on a step of the shell 58, not identified in detail.

The seal contour 80 surrounds, in accordance with the flow direction 90 of the fluid in this embodiment, the fluid inlet of the charge air cooler 12. The section plane B is positioned such that the connection flange 74 of the shell 60 is separated from the shell 60.

It is understood however that the seal contour 80 can also be arranged such that the fluid outlet of the charge air cooler 12 is surrounded.

Figure 8:
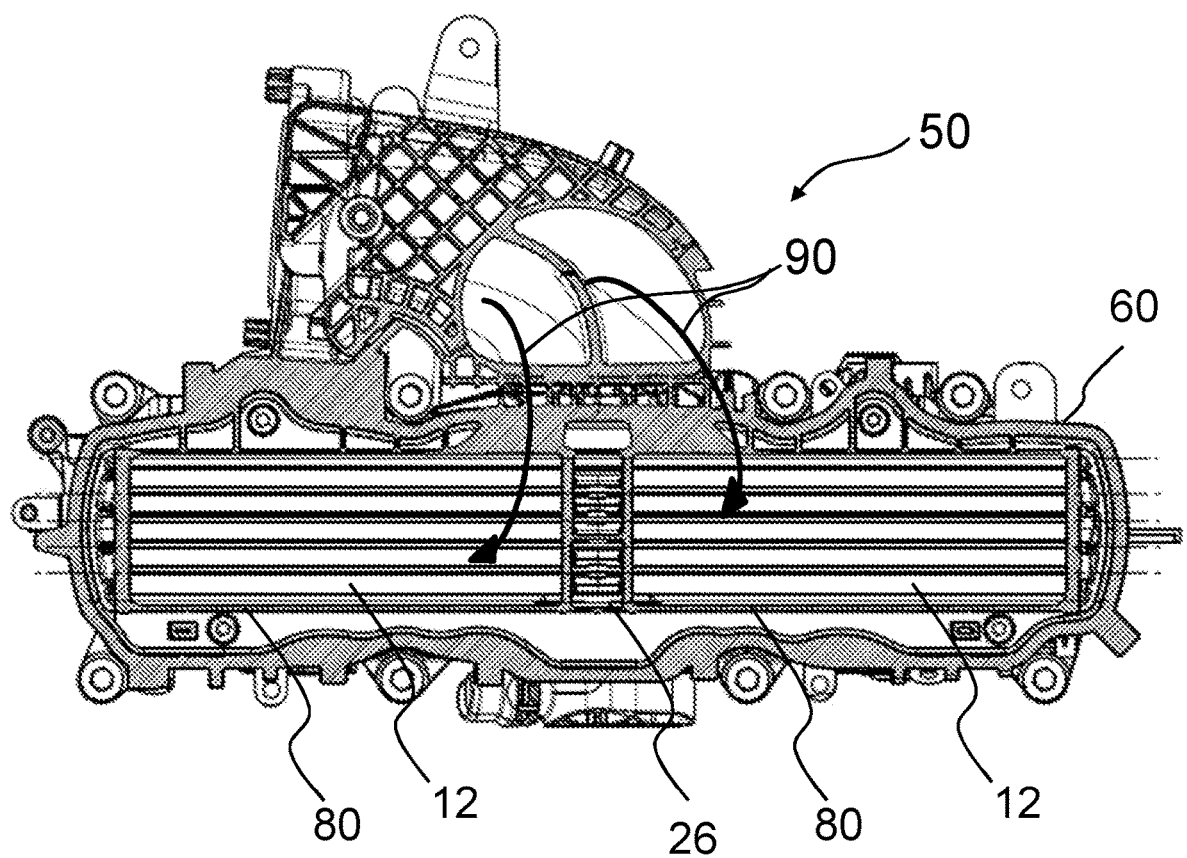
FIG. 8 shows a plan view of the charge air cooler in FIG. 5 in the section plane B.

As can be seen in FIG. 8 in a plan view of the section plane B, the charge air cooler 12 is separated by the intermediate space 26 that is not flowed through into two cooling regions, each with a respective fluid inlet of the charge air cooler 12. The seal contour 80 surrounds each fluid inlet completely.

What is claimed is:

1. A heat exchanger arrangement comprising:
   a housing comprising a fluid inlet for receiving a fluid in the form of heated air and a fluid outlet for discharging the fluid in the form of cooled air, the housing formed of a first shell and a second shell; and
   a heat exchanger arranged in the housing between the fluid inlet of the housing and the fluid outlet of the housing and surrounded by the housing;
   wherein the heat exchanger is arranged such that the fluid can flow through the heat exchanger;
   wherein the housing comprises a seal contour formed on at least one of the first shell and the second shell;
   wherein the seal contour of the housing comprises a meltable and formable plastic material that is materially fused to a seal surface of the heat exchanger at the fluid inlet of the housing or at the fluid outlet of the housing; and
   wherein a seal surface of the seal contour of the housing toward the heat exchanger is separate from and coplanar to a seal surface of one of the first shell and the second shell toward the other one of the first shell and the second shell.

2. The heat exchanger arrangement according to claim 1, wherein the first shell and the second shell are sequentially arranged in a flow direction of the fluid in an intended use of the heat exchanger arrangement.

3. The heat exchanger arrangement according to claim 1, wherein the first shell is connected to the second shell at a contact location.

4. The heat exchanger arrangement according to claim 3, wherein the first shell is welded to the second shell at the contact location.

5. The heat exchanger arrangement according to claim 1, wherein the seal contour is arranged at an inner wall of the first shell.

6. The heat exchanger arrangement according to claim 5, wherein the seal contour is integrally formed at the inner wall of the first shell.

7. The heat exchanger arrangement according to claim 1, wherein the seal surface of the seal contour toward the heat exchanger is aligned with the seal surface of the one of the first shell and the second shell toward the other one of the first shell and the second shell.

8. The heat exchanger arrangement according to claim 1, wherein the heat exchanger is surrounded by the housing.

9. The heat exchanger arrangement according to claim 1, wherein the heat exchanger is completely disposed within only one of the first shell and the second shell of the housing.

10. The heat exchanger arrangement according to claim 1, wherein the heat exchanger comprises a metal flange configured to seal against the seal contour, and wherein the seal contour is arranged at one of the first shell and the second shell.

11. The heat exchanger arrangement according to claim 1, wherein the heat exchanger is a charge air cooler and the housing is an intake pipe.

12. The heat exchanger arrangement according to claim 1, wherein the seal contour comprises a region having the seal surface, and wherein at least the seal surface of the region is formed of the meltable and deformable plastic material.

13. The heat exchanger arrangement according to claim 12, wherein the housing and the seal contour are formed of plastic material.

14. A method for producing a heat exchanger arrangement according to claim 1, the method comprising:
    melting the seal surface of the seal contour of the housing;
    materially fusing the seal surface of the seal contour of the housing against a seal region of the heat exchanger at the fluid inlet of the heat exchanger or at the fluid outlet of the heat exchanger; and
    joining the first shell and the second shell together at the seal surface that is separate from and coplanar to the seal surface of the seal contour of the housing.

15. The method according to claim 14, further comprising performing melting of the seal surface of the seal contour of the housing during joining of the first and second shells of the housing.

16. The method according to claim 15, further comprising joining the first and second shells of the housing to each other by welding.

17. An internal combustion engine comprising:
    a heat exchanger arrangement according to claim 1,
    wherein the housing is an intake pipe for charge air and
    wherein the heat exchanger is a charge air cooler arranged in the intake pipe.

* * * * *